United States Patent
Hong

(10) Patent No.: US 11,724,560 B2
(45) Date of Patent: Aug. 15, 2023

(54) CONTROL METHOD FOR AIR CONDITIONING OF A VEHICLE

(71) Applicants: HYUNDAI MOTOR COMPANY, Seoul (KR); KIA CORPORATION, Seoul (KR)

(72) Inventor: Gyu Sik Hong, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 21 days.

(21) Appl. No.: 17/514,972

(22) Filed: Oct. 29, 2021

(65) Prior Publication Data

US 2022/0314732 A1  Oct. 6, 2022

(30) Foreign Application Priority Data

Mar. 30, 2021 (KR) .................. 10-2021-0040847

(51) Int. Cl.
 *B60H 1/00* (2006.01)
 *B60H 1/32* (2006.01)

(52) U.S. Cl.
 CPC ....... *B60H 1/00278* (2013.01); *B60H 1/3205* (2013.01); *B60H 1/3227* (2013.01); *B60H 2001/003* (2013.01); *B60H 2001/3255* (2013.01)

(58) Field of Classification Search
 CPC .......... B60H 1/00278; B60H 1/0075; B60H 1/3205; B60H 1/3227; B60H 2001/003; B60H 2001/3255
 See application file for complete search history.

(56) References Cited

U.S. PATENT DOCUMENTS

| | | | | |
|---|---|---|---|---|
| 6,750,630 | B2* | 6/2004 | Inoue | H05K 7/20209 320/104 |
| 7,152,417 | B2* | 12/2006 | Morishita | B60L 58/26 62/186 |
| 9,365,093 | B2* | 6/2016 | Mizuguchi | H01M 6/5038 |
| 2009/0176150 | A1* | 7/2009 | Yanaka | H01M 10/633 429/120 |
| 2018/0015806 | A1* | 1/2018 | Yasuda | B60L 58/26 |
| 2022/0024277 | A1* | 1/2022 | Shimauchi | B60H 1/00792 |

* cited by examiner

*Primary Examiner* — Marc E Norman
(74) *Attorney, Agent, or Firm* — Lempia Summerfield Katz LLC

(57) ABSTRACT

A method for controlling air conditioning of a vehicle includes: determining whether an air conditioning control entry condition for battery cooling wind backseat backflow compensation is satisfied from environment information collected from the vehicle; starting air conditioning control for the battery cooling wind backseat backflow compensation if it is determined that the entry condition is satisfied; determining a compensation value corresponding to a current operating level of a battery cooling fan when the air conditioning control for the battery cooling wind backseat backflow compensation is started; compensating for a current control variable value of an air conditioning device component using the determined compensation value; and performing an air conditioning operation for compensation in accordance with a backflow of a battery cooling wind having cooled a battery toward a backseat by controlling a state of the air conditioning device component in accordance with the compensated control variable value.

15 Claims, 3 Drawing Sheets

CONTROL METHOD FOR AIR CONDITIONING OF A VEHICLE

CROSS-REFERENCE TO RELATED APPLICATION

This application claims under 35 U.S.C. § 119(a) the benefit of priority to Korean Patent Application No. 10-2021-0040847 filed on Mar. 30, 2021, the entire contents of which are incorporated herein by reference.

BACKGROUND

(a) Technical Field

The present disclosure relates to a method for controlling air conditioning of a vehicle, and more particularly, to a method for controlling air conditioning of a vehicle, which can solve the problem in that cooling wind or air, having cooled a battery, flows backward to backseats and increases the backseat temperature while air conditioning control and battery cooling are simultaneously performed in the vehicle.

(b) Background Art

As is known, a heating, ventilation, and air conditioning (HVAC) system for adjusting a room temperature and creating a pleasant indoor or interior environment has been mounted in a vehicle.

Recently, a fully automatic temperature control (FATC) system, which maintains a pleasant indoor environment by automatically adjusting an interior temperature in accordance with a temperature set by a driver or a passenger, has been applied to most vehicles.

In the FATC system, if a user sets an air conditioning target temperature, a controller, in order to control the vehicle interior temperature to the air conditioning target temperature set by the user, calculates an interior thermal load using information, such as the quantity of solar radiation, ambient temperature, and interior temperature, detected by sensors. Then, the controller determines a discharge mode, discharge temperature, discharge direction, and discharge air volume based on the corresponding air conditioning load.

Then, in order to control an air supply for air conditioning through the determined discharge mode, discharge temperature, discharge direction, and discharge air volume, the controller controls respective door actuators, such as an air intake door (internal/external switching door), a temp door (temperature adjustment door), and a wind or airflow direction adjustment door (mode door), and operation elements, such as an air conditioning blower, an air conditioner compressor, and an electric heater.

Further, in a vehicle air conditioning device, an air conditioning mode is classified into various modes in accordance with an air intake method and an air discharge method. In accordance with the air intake method, the air conditioning mode is classified into an outside air mode and an inside air mode. In order to select and control the inside air mode and the outside air mode, an air intake door and a door actuator are installed.

In accordance with the air discharge mode, the air conditioning mode is classified into a face mode (or referred to as a vent mode), a floor (FLR) mode, a defrost (DEF) mode, and a bi-level mode. For this, the air conditioning device includes a wind direction control door that changes an air flow path in accordance with the respective modes and a vent door installed in an inlet part of each vent to open/close the vent.

Vents of the air conditioning device are classified into a face vent discharging air toward a face and a chest, a floor vent discharging air toward a vehicle floor and driver's feet, and a defrost vent discharging air toward a vehicle windshield glass. A vent door is installed in an inlet part of each vent to open/close the corresponding vent in accordance with the air conditioning mode.

In recent vehicles, an air conditioning device is applied, which can divide the interior space into a plurality of zones and perform air conditioning with respect to the divided zones. As an example, a 3-zone type air conditioning device is known, which performs individual air conditioning with respect to a driver's seat and a passenger seat, which are front seats, and 2-row backseats.

In such an air conditioning device, with respect to the driver's seat and the passenger seat, the air for air conditioning may be discharged through vents provided on a dash panel. With respect to the backseats, the air for air conditioning may be discharged through console vents formed on rear sides of a console box.

In addition, a recent luxury vehicle may be additionally provided with a center filler vent and a rear floor discharge port in addition to the console vent in order to further improve the cooling/heating performance for the backseat space.

Meanwhile, in a vehicle driven by a motor, for example, in an electrified vehicle, such as a hybrid electric vehicle (HEV), a plug-in HEV (PHEV), or a battery electric vehicle (BEV), a high-voltage battery is mounted to supply operating power to the motor.

In the typical electrified vehicle, the high-voltage battery, which is manufactured as a module through gathering of several batteries in the unit of a cell, is used due to problems of limited space and size in the vehicle.

Further, a battery pack, which is composed of a plurality of battery modules, is mounted in the vehicle using a battery tray installed on a bottom part inside the vehicle.

Further, in the vehicle, the battery radiates a large amount of heat when being charged or discharged. In order to manage the battery temperature and to prevent the problem of battery overheating, a battery cooling system is provided, which cools the battery by blowing out the air through a cooling fan.

The battery cooling system in the related art discharges the air having cooled the battery (hereinafter, referred to as "battery cooling wind") to outside around the backseats, seatbelt buckles of the backseats, or package trays.

However, in the case that interior cooling in summer and battery cooling are simultaneously performed and the battery cooling wind is discharged around the backseats, the battery cooling wind flows backward to the backseats. Thus, the backseats continuously get hotter than the front seats.

In particular, in the case of an inside air mode in which the inside air is not discharged to the outside and interior ventilation is not performed, a large amount of battery cooling wind flows toward the backseats to cause a temperature difference between the front seats and the backseats to become greater. Thus, the comfort of the backseats is greatly degraded.

In the case of additionally applying a duct structure to the backseats to make the battery cooling wind discharged toward a trunk, the above-described problem may be partially improved. However, it is difficult to apply the structure in practice due to the increase in the need for package space for the duct structure and increased manufacturing costs.

Further, since the currently applied in-car sensor is mounted on the side of a front-seat crash pad, the in-car sensor is unable to detect a state where the backseats get hotter due to the battery cooling wind. Thus, it is difficult to improve the problem of the backseat temperature increase.

The above information disclosed in this background section is only to enhance understanding of the background of the present disclosure. Therefore, the Background section may contain information that does not form the prior art that is already known in this country to a person of ordinary skill in the art.

SUMMARY OF THE DISCLOSURE

The present disclosure is proposed for solving the above problems and provides a method for controlling air conditioning of a vehicle. The method can solve the problem in that cooling wind, having cooled a battery, flows backward to backseats and increases the backseat temperature while air conditioning control and battery cooling are simultaneously performed in the vehicle.

The objects of the present disclosure are not limited to those as described above. Other unmentioned objects of the present disclosure can be clearly understood from the following description by those of ordinary skill in the art to which the present disclosure pertains (hereinafter, "ordinary technicians").

In one aspect of the present disclosure, a method for controlling air conditioning of a vehicle includes determining, by a controller, whether a determined air conditioning control entry condition for battery cooling wind backseat backflow compensation is satisfied from environment information collected from the vehicle. The method also includes starting, by the controller, air conditioning control for the battery cooling wind backseat backflow compensation if it is determined that the determined entry condition is satisfied. The method also includes determining, by the controller, a compensation value corresponding to a current operating level of a battery cooling fan when the air conditioning control for the battery cooling wind backseat backflow compensation is started. The method also includes compensating, by the controller, for a current control variable value of an air conditioning device component using the determined compensation value. The method also includes performing, by the controller, an air conditioning operation for compensation in accordance with a backflow of a battery cooling wind, having cooled a battery, toward a backseat by controlling a state of the air conditioning device component in accordance with the compensated control variable value.

Here, the environment information may include one or two of an ambient temperature detected by an ambient temperature sensor or a solar insolation amount detected by an insolation sensor.

Further, the air conditioning control entry condition for the battery cooling wind backseat backflow compensation may include at least one of a condition on which the ambient temperature detected by the ambient temperature sensor is higher than a predetermined first set temperature or a condition on which the solar insolation amount detected by the insolation sensor is larger than a predetermined set value.

Further, in starting the air conditioning control for the battery cooling wind backseat backflow compensation, the controller may be configured to start the air conditioning control for the battery cooling wind backseat backflow compensation in a state where it is determined that the entry condition is satisfied, air conditioner-on and automatic air conditioning control are currently selected, and the battery cooling fan is in operation.

Further, in compensating for the current control variable value of the air conditioning device component, the controller may be configured to determine whether a compensation condition determined based on the current operating state information of the air conditioning device component is satisfied. The controller may also be configured to compensate for the current control variable value of the corresponding air conditioning device component only in case that the compensation condition is satisfied.

Further, the air conditioning device component may include an air conditioning blower, a backseat temp door actuator, and an evaporator.

Further, the operating state information of the air conditioning device component may include an operating voltage of the air conditioning blower, an operating voltage of the backseat temp door actuator, and a temperature of the evaporator.

Further, the compensation condition may include a condition on which a current operating voltage of the air conditioning blower is lower than a predetermined first set voltage, a condition on which a current operating voltage of the backseat temp door actuator exceeds a predetermined second set voltage, and a condition on which a current evaporator temperature detected by the evaporator temperature sensor exceeds a predetermined second set temperature.

Further, in compensating for the current control variable value of the air conditioning device component, the current control variable value may include an operating target voltage of the air conditioning blower. In performing the air conditioning operation for the compensation, the controller may be configured to increase a rotation speed of the air conditioning blower by increasing the operating target voltage of the air conditioning blower as large as the compensation value corresponding to the operating level of the battery cooling fan.

Here, in determining the compensation value, the compensation value for compensating for the operating target voltage of the air conditioning blower may be determined as a larger value so that the rotation speed of the air conditioning blower is further increased as the operating level of the battery cooling fan becomes higher.

Further, in compensating for the current control variable value of the air conditioning device component, the current control variable value may include an operating target voltage of the backseat temp door actuator. In performing the air conditioning operation for the compensation, the controller may be configured to increase an amount of cooling air that passes through the evaporator by means of a backseat temp door by reducing the operating target voltage of the backseat temp door actuator as large as the compensation value corresponding to the operating level of the battery cooling fan.

Further, in determining the compensation value, the compensation value for compensating for the operating target voltage of the backseat temp door actuator may be determined as a larger value so that the amount of cooling air that passes through the evaporator is further increased as the operating level of the battery cooling fan becomes higher.

Further, in compensating for the current control variable value of the air conditioning device component, the current control variable value may include an evaporator target temperature. In performing the air conditioning operation for the compensation, the controller may be configured to lower a temperature of a cooling air that passes through the evaporator by lowering the evaporator target temperature as large as the compensation value corresponding to the operating level of the battery cooling fan.

Further, in determining the compensation value, the compensation value for compensating for the evaporator target temperature may be determined as a larger value so that the temperature of the cooling air that passes through the evaporator is further lowered as the operating level of the battery cooling fan becomes higher.

In this case, the controller may be configured to control an operation of a compressor so that a current evaporator temperature detected by an evaporator temperature sensor follows the evaporator target temperature compensated for by the compensation value.

According to the method for controlling air conditioning of a vehicle according to the present disclosure, it is possible to solve the problem in that the cooling wind, having cooled the battery, flows backward to the backseats and increases the backseat temperature while the air conditioning control and the battery cooling are simultaneously performed in the vehicle.

Other aspects and embodiments of the present disclosure are discussed below.

It should be understood that the terms "vehicle" or "vehicular" or other similar terms as used herein include motor vehicles in general. Such motor vehicles include passenger automobiles including sport utility vehicles (SUV), buses, trucks, various commercial vehicles, watercraft including a variety of boats and ships, aircraft, and the like. Such vehicles also include hybrid vehicles, electric vehicles, plug-in hybrid electric vehicles, hydrogen-powered vehicles, and other alternative fuel vehicles (e.g. fuels derived from resources other than petroleum). As referred to herein, a hybrid vehicle is a vehicle that has two or more sources of power, for example vehicles that are both gasoline-powered and electric-powered.

The above and other features of the present disclosure are discussed below.

BRIEF DESCRIPTION OF THE DRAWINGS

The above and other features of the present disclosure are now described in detail with reference to certain embodiments thereof illustrated the accompanying drawings, which are given hereinafter by way of illustration only and thus are not limitative of the present disclosure, and wherein.

Figure 1:
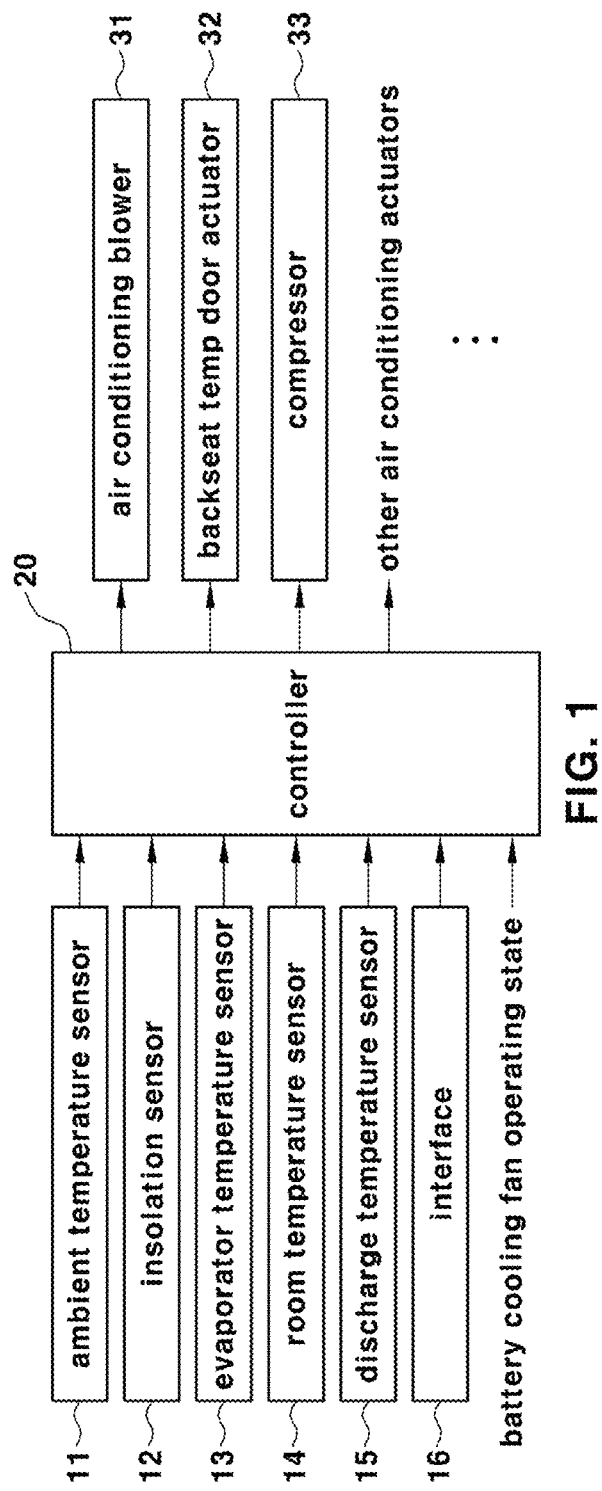
FIG. 1 is a block diagram illustrating the configuration of a device for performing an air conditioning control process of a vehicle according to an embodiment of the present disclosure.

It should be understood that the appended drawings are not necessarily to scale and present a somewhat simplified representation of various features illustrating the basic principles of the present disclosure. The specific design features of the present disclosure as disclosed herein, including, for example, specific dimensions, orientations, locations, and shapes should be determined in part by the particular intended application and use environment.

In the figures, reference numbers refer to the same or equivalent parts of the present disclosure throughout the several figures of the drawing.

DETAILED DESCRIPTION

Specific structural and functional explanations disclosed in embodiments of the present disclosure are merely exemplified for the purpose of explaining the embodiments according to the concept of the present disclosure. The embodiments according to the concept of the present disclosure may be carried out in various forms. Further, the present disclosure should not be interpreted to be limited to the embodiments described in the present specification and should be understood to include all modifications, equivalents, and alternatives that are included in the idea and technical scope of the present disclosure.

Meanwhile, in the present disclosure, the terms, such as "first and/or second", may be used to describe diverse constituent elements, but the constituent elements are not limited by the terms. The terms are only for the purpose of discriminating one constituent element from other constituent elements. For example, without departing from the scope according to the concept of the present disclosure, a first constituent element may be called a second constituent element and the second constituent element may be called the first constituent element in a similar manner.

It should be understood that, if a certain constituent element is mentioned to be "connected" or "coupled" to another constituent element, it includes both a case that the certain constituent element is directly connected or coupled to the another constituent element and a case that the certain constituent element is connected or coupled to the another constituent element via still another constituent element. In contrast, if a certain constituent element is mentioned to be "directly connected or coupled" to another constituent element, it should be understood that the certain constituent element is connected or coupled to another constituent element without intervention of any other constituent element. Other expressions for explaining the relationship between the constituent elements, i.e., expressions, such as "between" and "just between" or "neighboring" and "directly neighboring", should be interpreted in the same manner.

Over the whole specification, the same reference numerals denote the same or equivalent constituent elements. The terms used in the present specification are used to describe embodiments only but are not intended to limit the present disclosure. In the present specification, a singular expression includes a plural expression unless specially stated in a different manner. In the specification, it should be understood that the terms "comprises" and/or "comprising" specify the presence of stated constituent elements, steps, operations, and/or devices. However, the terms "comprises" and/or "comprising" do not preclude the presence or addition of one or more other constituent elements, steps, operations, and/or devices. When a component, device, element, or the like of the present disclosure is described as having a purpose or performing an operation, function, or the like, the component, device, or element should be considered herein as being "configured to" meet that purpose or to perform that operation or function.

Hereinafter, embodiments of the present disclosure are described in detail with reference to the accompanying drawings.

The present disclosure is to provide a method for controlling air conditioning of a vehicle. The method can solve the problem in that cooling wind, having been blown out by a battery cooling fan and having cooled a battery, flows backward to vehicle backseats and continuously increases the backseat temperature while interior cooling and battery cooling are simultaneously performed in the vehicle.

The present disclosure can be applied to an electrified vehicle that is driven by driving a motor with power being supplied by a mounted high-voltage battery, for example, a hybrid electric vehicle (HEV), a plug-in HEV (PHEV), or a battery electric vehicle (BEV). The present disclosure relates to a method for controlling air conditioning of a vehicle, whereby the method can effectively solve the problem in that the backseat temperature is increased due to the battery cooling wind during interior cooling in summer in the electrified vehicle.

The present disclosure relates to a method for controlling air conditioning of a vehicle, whereby the method can solve the problem of a backseat temperature increase only by implementation of an air conditioning control logic without separate hardware addition, manufacturing cost increase, and weight increase.

The present disclosure provides a method for controlling air conditioning in conjunction with a battery cooling fan, which controls an operation of an air conditioning device in conjunction with the operating state of the battery cooling fan in order to solve the above-described problem.

Figure 2:
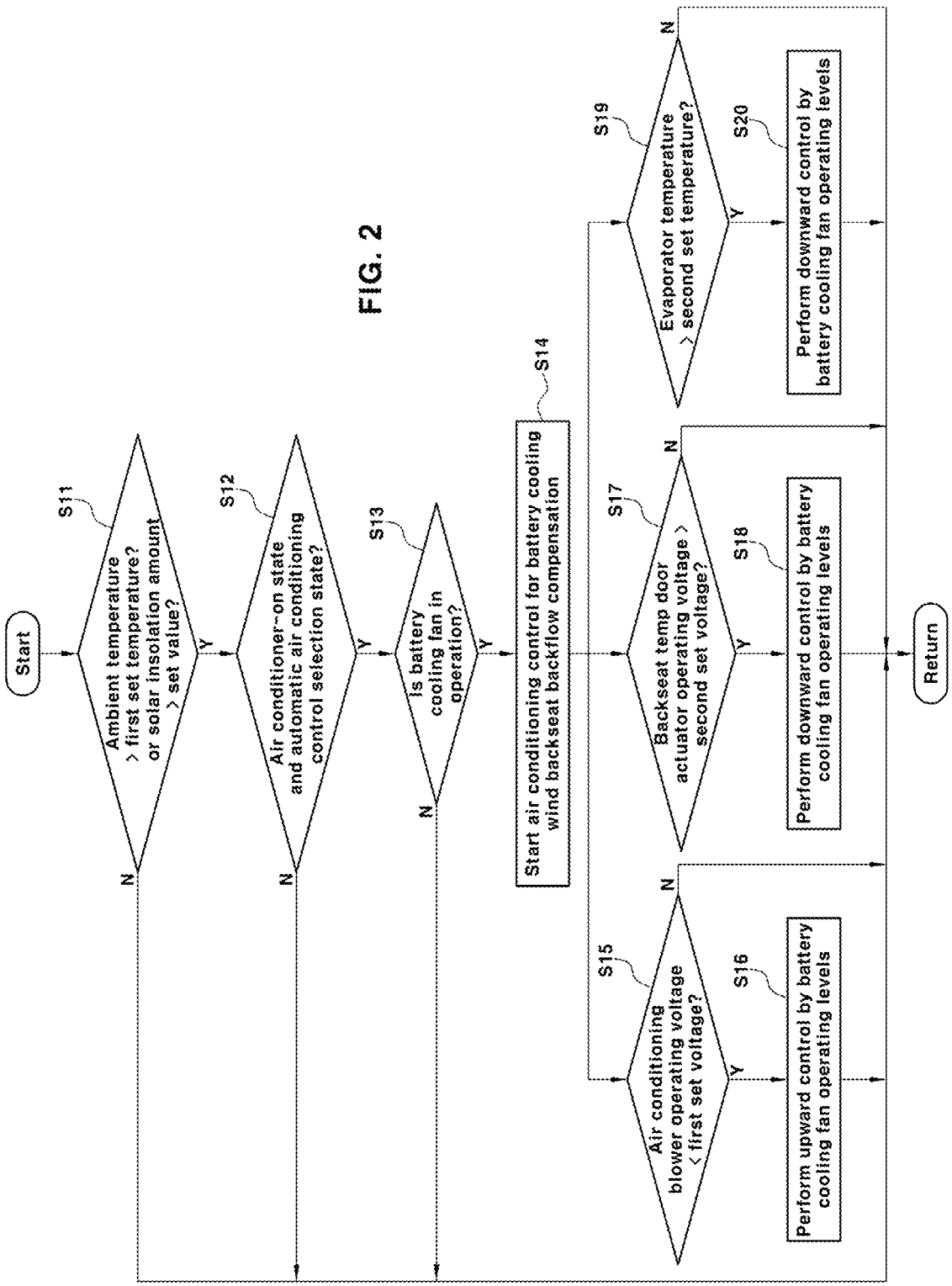
FIG. 2 is a flowchart illustrating an air conditioning control process of a vehicle according to an embodiment of the present disclosure.
Figure 3:
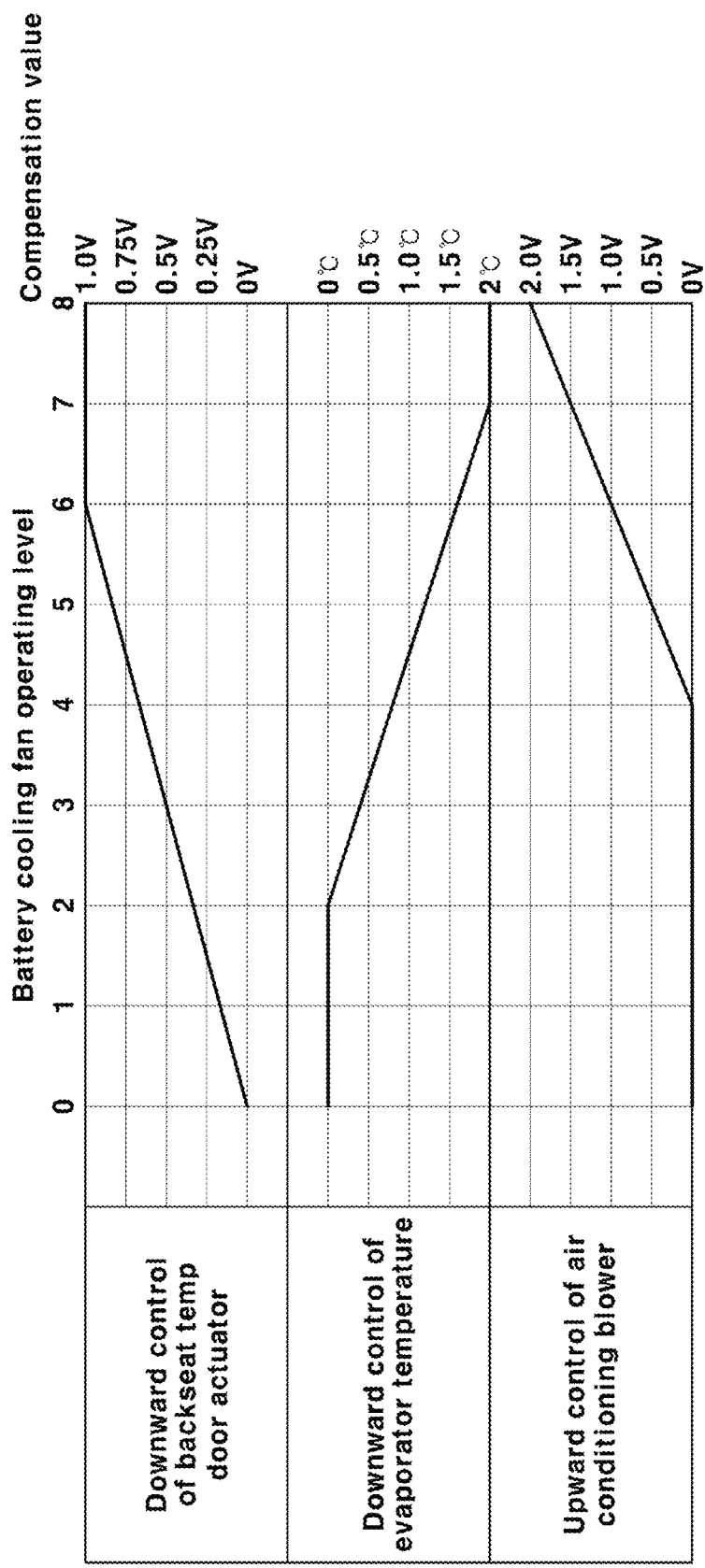
FIG. 3 is a diagram illustrating compensation values set by operating levels of a battery cooling fan in an air conditioning control process of a vehicle according to an embodiment of the present disclosure.

Hereinafter, the present disclosure is described with reference to the accompanying drawings. FIG. 1 is a block diagram illustrating the configuration of a device for performing an air conditioning control process of a vehicle according to an embodiment of the present disclosure. FIG. 2 is a flowchart illustrating an air conditioning control process of a vehicle according to an embodiment of the present disclosure. FIG. 3 is a diagram illustrating compensation values set by operating levels of a battery cooling fan in an air conditioning control process of a vehicle according to an embodiment of the present disclosure.

First, referring to FIG. 1, in order to solve the problem of the backseat temperature increase due to the battery cooling wind when the vehicle interior cooling and the battery cooling are simultaneously performed, a device for performing an air conditioning control process according to an embodiment of the present disclosure is provided. The device is configured to include an ambient temperature sensor 11, an insolation sensor 12, an evaporator temperature sensor 13, an in-car sensor 14, a discharge temperature sensor 15, an interface 16, a controller 20, an air conditioning blower 31, a backseat temp door actuator 32, and an air conditioner compressor 33.

Among them, the ambient temperature sensor 11, the insolation sensor 12, the evaporator temperature sensor 13, the in-car sensor 14, and the interface 16 are constituent elements for detecting and inputting, to a controller 20, necessary information to perform the air conditioning control, particularly to perform the air conditioning control for battery cooling wind backseat backflow compensation as described below. The ambient temperature sensor 11, the insolation sensor 12, the evaporator temperature sensor 13, the in-car sensor 14, and the interface 16 are pre-installed and used in an ordinary vehicle in which an automatic air conditioning control (auto control) is performed.

The sensors are state detectors detecting in real time state data necessary for the air conditioning control in the vehicle. Among them, in an embodiment, the ambient temperature sensor 11 is a sensor detecting an ambient temperature, the insolation sensor 12 is a sensor detecting a solar insolation amount, and the evaporator temperature sensor 13 is a sensor detecting the current temperature of an evaporator. Further, the in-car sensor 14 is a sensor detecting a vehicle interior temperature and the discharge temperature sensor 15 is a sensor detecting the temperature of discharge air (discharge temperature) being discharged through respective vents.

In this case, information necessary for the air conditioning control in the vehicle, i.e., real-time state data being detected by the sensors are the ambient temperature, the solar insolation amount, the evaporator temperature, the interior temperature, and the temperature of the discharge air. Among them, the environment information being used to determine an air conditioning control entry condition for battery cooling wind backseat backflow compensation to be described later includes at least one of the ambient temperature or the solar insolation amount.

The interface 16 is a user input means, such as buttons or a touch screen, which is provided for a user, who is a driver or the like, to operate the air conditioning device or to perform setting and inputting of an air conditioning target temperature. In an ordinary vehicle, the interface 16 for air conditioning is provided to basically perform an automatic air conditioning control select/release operation, an air conditioner on/off operation, and an air conditioning target temperature input. The interface 16 for air conditioning is provided to select a desired mode among circulation modes, such as an outside air mode and an interior air mode, and to select a desired mode among discharge modes, such as a face mode, a floor mode, a defrost mode, and a bi-level mode.

Further, the controller 20 calculates an interior heat load based on the information collected in real time in the vehicle, i.e., the above-described state data for the air conditioning control and the air conditioning target temperature. Then, the controller 20 determines the discharge mode of the air conditioning device, discharge temperature, discharge direction, and discharge air volume based on the corresponding air conditioning load. Further, the controller 20 controls operating elements, such as an air conditioning actuator, such as a backseat temp door actuator 32, an air conditioning blower 31, and an air conditioner compressor 33, based on the operating state value information of the air conditioning device, such as the determined discharge mode, discharge temperature, discharge direction, and discharge air volume.

For example, the controller 20 may adjust the amount of air (cooling air for interior cooling) passing through the evaporator (cooling air path) of the air conditioning air being discharged toward the backseat by controlling the operation of the backseat temp door actuator 32 based on the air conditioning load. In another embodiment, the controller 20 may adjust a flow amount of the air conditioning air by controlling the operating voltage of the air conditioning blower 31. The controller 20 may also control the evaporator temperature as the evaporator target temperature by operating the air conditioner compressor 33 based on the evaporator temperature being detected by the evaporator temperature sensor 13.

In this case, the controller 20 determines control variable values by air conditioning device components based on the information necessary for the vehicle air conditioning control or the air conditioning load determined therefrom. As an example, the controller 20 may determine an operating target voltage V of the backseat temp door actuator as the control variable value for controlling the operation of the backseat temp door actuator 32. Further, the controller 20 may determine an operating target voltage of the air conditioning blower as the control variable value for controlling the operation of the air conditioning blower 31. Further, the controller 20 may determine the evaporator target temperature that is the control variable value being controlled through the operation control of the air conditioner compressor 33.

Further, in an embodiment of the present disclosure, the controller 20 determines a compensation value in accordance with an operating level of the battery cooling fan, compensates for the control variable values by the air conditioning device components using the determined compensation value, and then performs the air conditioning control for the battery cooling wind backseat backflow compensation to control the air conditioning device components based on the compensated control variable values.

In the following description, the battery cooling wind means an air having been blown out by the battery cooling fan and having cooled the battery. Since the battery cooling wind is in a state where heat has been transferred from the battery, it corresponds to a high-temperature air.

Further, the air conditioning control for compensating for the battery cooling wind backseat backflow may mean the control of the operation of the air conditioning device components so as to determine the volume of the battery cooling wind that can flow toward the backseat as the operating levels of the battery cooling fan and then to properly adjust the volume of the air conditioning air being supplied toward the backseat. The adjustment may be performed in accordance with the volume of the battery cooling wind (operating level of the battery cooling fan), the volume of the cooling air passing through the evaporator among the air conditioning air, or the temperature of the air conditioning air (or cooling air). In other words, the air conditioning control for compensating for the battery cooling wind backseat backflow means performing of the air conditioning compensation control in accordance with an inflow of the battery cooling wind having cooled the battery toward the vehicle backseat. The air conditioning control for compensating for the battery cooling wind backseat backflow also means controlling of the cooling air being discharged to the interior in accordance with the volume of the battery cooling wind flowing toward the backseat.

In an embodiment of the present disclosure, the air conditioning control for compensating for the battery cooling wind backseat backflow includes a downward control for reducing the control variable value of the air conditioning device component in accordance with the operating level of the battery cooling fan. The air conditioning control for compensating for the battery cooling wind backseat backflow also includes an upward control for increasing the control variable value of the air conditioning device component in accordance with the operating level of the battery cooling fan. Here, the control variable value may be a control target value of the corresponding component.

In an embodiment of the present disclosure, the air conditioning device components that are controlled based on the compensated control variable values during the air conditioning control for compensating for the battery cooling wind backseat backflow include the backseat temp door actuator 32, the air conditioning blower 31, and the air conditioner compressor 33. Further, the control variable values include the operating target voltage of the backseat temp door actuator 32, the operating target voltage of the air conditioning blower 31, and the evaporator target temperature. In an embodiment of the present disclosure, the controller 20 controls the operation of the air conditioner compressor 33 in order to control the evaporator temperature as the evaporator target temperature.

As described above, the controller 20 compensates for the operating target voltage of the backseat temp door actuator 32, the operating target voltage of the air conditioning blower 31, and the evaporator target temperature in accordance with the operating level of the battery cooling fan. In the present disclosure, to compensate for the control target values, i.e., the operating target voltages and the target temperature, the air conditioning device components are controlled so that the operating voltages and the temperature follow the raised or lowered target values. Thus, this may mean to raise or lower the operating voltages and the temperature of the actual air conditioning device components.

In other words, in the present disclosure, the controller 20 controls the operating voltage of the backseat temp door actuator 32 based on the compensated operating target voltage value in accordance with the operating level of the battery cooling fan. The controller 20 also controls the operating voltage of the air conditioning blower 31 based on the compensated operating target voltage value in accordance with the operating level of the battery cooling fan. Further, the controller 20 controls the operation of the air conditioner compressor 33 so that the evaporator temperature being detected by the evaporator temperature sensor 13 follows the compensated evaporator target temperature in accordance with the operating level of the battery cooling fan.

Hereinafter, referring to FIGS. 2 and 3, the air conditioning control process according to an embodiment of the present disclosure is described in more detail.

In the present disclosure, the state data for the air conditioning control for determining whether the set air conditioning control entry condition for the cooling wind backseat backflow compensation is satisfied includes one or two of the ambient temperature detected by the ambient temperature sensor 11 and the solar insolation amount detected by the insolation sensor 12.

First, the controller 20 determines whether at least one of a condition on which the ambient temperature detected by the ambient temperature sensor 11 is higher than a first set temperature (e.g., 20° C.) or a condition on which the solar insolation amount detected by the insolation sensor 12 is larger than a set value (e.g., 1000 W or 500 W) is satisfied (S11).

Here, if the at least one condition on which the ambient temperature is higher than the first set temperature or on which the solar insolation amount is larger than the set value is satisfied, the backseat passenger may feel unpleasant due to the backseat backflow of the battery cooling wind while the battery cooling fan operates to perform the battery cooling.

If at least one of the two conditions is satisfied, the controller 20 determines whether the current state is the air conditioner-on state and the automatic air conditioning control selection state based on the information input from the interface 16 (S12).

If the current state is the air conditioner-on state and the automatic air conditioning control selection state, the controller 20 determines whether the battery cooling fan is currently in operation (S13). If the battery cooling fan is in operation, the controller 20 starts the air conditioning control for the battery cooling wind backseat backflow compensation (S14).

In other words, as shown in FIG. 2, in case that the condition on which the ambient temperature is higher than the first set temperature or the condition on which the solar insolation amount is larger than the set value is satisfied, and all of the air conditioner-on state, the automatic air conditioning control selection state, and the condition on which the battery cooling fan is in operation are satisfied, the air conditioning control for the battery cooling wind backseat backflow compensation starts.

If the above-described conditions are all satisfied and the air conditioning control for the battery cooling wind backseat backflow compensation starts, a downward control for reducing the control variable value (i.e., control target value) or an upward control for increasing the control variable value in accordance with the operating level of the battery cooling fan is performed with respect to the air conditioning device components.

Specifically, the controller 20 starts the air conditioning control for the battery cooling wind backseat backflow compensation and performs the air conditioning control by controlling the operations of the air conditioning device components by battery cooling fan operation levels for the battery cooling wind backseat backflow compensation.

In an embodiment of the present disclosure, the air conditioning device components may include the air conditioning blower 31, the backseat temp door actuator 32, and the evaporator as described above. These components become targets for the upward or downward control by the battery cooling fan operation levels for the battery cooling wind backseat backflow compensation during the air conditioning control for the battery cooling wind backseat backflow compensation.

Here, the operating state of the evaporator may be controlled by controlling the operating state of the air conditioner compressor 33. Further, the operating state of the evaporator may be the evaporator temperature and the control of the evaporator temperature may be performed by controlling the operation of the air conditioner compressor 33. In an embodiment of the present disclosure, the controller 20 controls the operation of the air conditioner compressor 33 in order to control the evaporator temperature, i.e., in order to control the evaporator temperature as the evaporator target temperature that is the control variable value.

In an embodiment of the present disclosure, the upward control by the battery cooling fan operating levels is performed with respect to the air conditioning blower 31 and the downward control by the battery cooling fan operating levels is performed with respect to the backseat temp door actuator 32 and the evaporator. During the upward control or the downward control, the controller 20 may use predetermined set data as the compensation values for the control variable values by the battery cooling fan operating levels.

Further, the controller 20 determines the compensation value corresponding to the current battery cooling fan operating level using the set data, compensates for the current control variable value of the corresponding component as the determined compensation value, and then controls the operation of the corresponding component based on the compensated control variable value. However, in an embodiment of the present disclosure, the evaporator target temperature is used as the control variable value of the evaporator. In this case, the controller 20 compensates for the evaporator target temperature as large as the compensation value corresponding to the battery cooling fan operating level and then controls the operation of the air conditioner compressor 33 so as to control the evaporator temperature as the compensated evaporator target temperature.

In an embodiment of the present disclosure, the compensation value is used to perform compensation to increase the current control variable value (i.e., control target value) by components or to perform compensation to reduce the current control variable value. Through such compensation, the control to increase the current control variable value is the upward control, and the control to reduce the current control variable value is the downward control. Further, since the compensation value is determined as the value corresponding to the battery cooling fan operating level, the air conditioning control accompanying the above-described compensation may be the upward control or the downward control by the battery cooling fan operating levels.

In an embodiment of the present disclosure, in starting the air conditioning control process for the battery cooling wind backseat backflow compensation, the controller 20, as shown in FIG. 2, may determine whether it is possible to perform the upward control or the downward control based on the current operating state information of the air conditioning device components prior to starting of the upward control or the downward control for the air conditioning device components by the battery cooling fan operating levels (S15, S17, and S19).

In other words, only in case that the compensation condition determined based on the current operating state information of the component is satisfied, the controller 20 performs the control for the battery cooling wind backseat backflow compensation for the corresponding component, i.e., the upward control or the downward control by the battery cooling fan operating levels. The current operating state information of the component includes the current operating voltage of the air conditioning blower 31, the current operating voltage of the backseat temp door actuator 32, and the current evaporator temperature.

As described above, in the process of determining whether it is possible to perform the upward control or the downward control for the corresponding component, the current operating voltage of the air conditioning blower 31 is first compared with a predetermined first set voltage (e.g., 7V) (S15). If the current operating voltage is lower than the first set voltage, the upward control by the battery cooling fan operating levels for the air conditioning blower 31 is performed (S16).

However, if the current operating voltage of the air conditioning blower 31 is equal to or higher than the first set voltage (e.g., 7V), the operating voltage of the air conditioning blower 31 is increased to an operating target voltage value (e.g., 9V) using the compensation values by the battery cooling fan operating levels when the upward control (operating target voltage value increase control) for the air conditioning blower 31 is performed. Thus, heterogeneity may occur due to the result of the control. For example, in case that the first set voltage is 7V, the compensation value is 2V, the operating target voltage value after the compensation is 9V, and the operating voltage of the air conditioning blower 31 is controlled to be 9V that is the target voltage based on the operating target voltage value, operational heterogeneity, such as noise of the air conditioning blower 31, may occur.

Accordingly, the upward control for the air conditioning blower 31 is performed only on condition that the current operating voltage of the air conditioning blower 31 is lower than the first set voltage so that the operating target voltage of the air conditioning blower 31 after the compensation does not exceed the voltage that may cause a feeling of heterogeneity in an actual air conditioning blower operating state.

If the air conditioning blower operating target voltage value is increased as large as the compensation value by the battery cooling fan operating levels on condition that the current operating voltage of the air conditioning blower 31 is equal to or higher than the first set voltage, not only the feeling of heterogeneity, i.e., the operating noise occurs, but also the flow noise occurs greatly as the wind, which is the air flow being blown out by the air conditioning blower 31 and being discharged to the vehicle interior, becomes too strong. The upward control of the air conditioning blower 31 as described above may cause a driver or a passenger to feel unpleasant and may greatly deteriorate the interior comfort. Accordingly, it is required to perform the upward control for the air conditioning blower 31 only on condition that the current operating voltage of the air conditioning blower 31 is lower than the first set voltage.

Further, the upward control of the air conditioning blower 31 means the control to increase the rotation speed of the air conditioning blower 31 step by step as the battery cooling fan operating level is increased. For this, the upward control process of the air conditioning blower 31 includes a control variable value compensation process in which the air conditioning blower control variable value (control target value) in accordance with the current air conditioning load is compensated for and increased as large as the compensation value determined in accordance with the current battery cooling fan operating level. Here, the control variable value of the air conditioning blower 31 is the air conditioning blower operating target voltage. In the end, the control variable value compensation of the air conditioning blower means compensation to increase the operating target voltage of the air conditioning blower as large as the compensation value corresponding to the current battery cooling fan operating level.

In an embodiment of the present disclosure, the compensation value corresponding to the battery cooling fan operating level is determined by the controller 20 using set data as exemplified in FIG. 3. Here, the set data is set using data obtained through prior research and evaluation and test processes and may be a map or table indicating correlations between the battery cooling fan operating levels and the compensation values, or a diagram or a mathematical expression as shown in FIG. 3.

As exemplified in FIG. 3, the compensation value for the air conditioning blower upward control is a voltage compensation value for the air conditioning blower operating target voltage. This compensation value may be set through differentiation to the value corresponding to the battery cooling fan operating level. In other words, as the battery cooling fan operating level differs, the compensation value may be set to a different voltage value at least a partial operating level.

In compensating for the control variable value during the upward control of the air conditioning blower, it is necessary to increase the air blowing amount and the interior discharge amount by means of the air conditioning blower 31 as the battery cooling fan operating level becomes heightened. For this, the compensation is necessary to increase the rotation speed of the air conditioning blower 31 as the battery cooling fan operating level becomes heightened. Accordingly, as shown in FIG. 3, as the battery cooling fan operating level becomes heightened, the air conditioning blower operating target voltage is to be compensated for as a larger voltage value. In other words, as the battery cooling fan operating level becomes higher, the greater compensation value is to be used. Referring to FIG. 3, under the assumption that first to eighth battery cooling fan operating levels exist, it is exemplified that, as the battery cooling fan operating level is heightened from the fourth level to the eighth level, the compensation value is gradually increased.

Further, if the air conditioning control for the battery cooling wind backseat backflow compensation starts, the controller 20 compares the current operating voltage of the backseat temp door actuator 32 with a predetermined second set voltage (e.g., 0.3V) (S17). If the current operating voltage exceeds the second set voltage, the controller 20 performs the downward control by the battery cooling fan operating levels with respect to the backseat temp door actuator 32 (S18). However, if the current operating voltage of the backseat temp door actuator 32 is equal to or lower than the second set voltage (e.g., 0.3V), the controller 20 does not perform the downward control with respect to the backseat temp door actuator 32.

The backseat temp door is a door for adjusting the ratio of the cooling air that passes through the evaporator to the air that does not pass through the evaporator among the air for the air conditioning, and finally, is a door for adjusting the temperature of the air for the air conditioning for the interior cooling while the air conditioner operates. Here, the air for the air conditioning is an air for interior cooling, being supplied toward the backseat. In the ordinary air conditioning device, the location of the backseat temp door is controlled to control the temperature of the air for the air conditioning through adjustment of an amount of the cooling air (cooling air amount) passing through the evaporator.

Specifically, in order to control the cooling air amount and the temperature of the air for the air conditioning in accordance with the air conditioning load and to control the location of the backseat temp door, the controller 20 controls the operation of the backseat temp door actuator 32. In this case, the controller 20 determines the operating target voltage of the backseat temp door actuator 32 as the control variable value of the backseat temp door actuator 32 in accordance with the current air conditioning load and then controls the operating voltage of the backseat temp door actuator 32 as the finally determined operating target voltage value.

In an embodiment of the present disclosure, during the downward control of the backseat temp door actuator 32, the controller 20 compensates for the operating target voltage of the backseat temp door actuator 32 determined in accordance with the current air conditioning load as large as the compensation value that is determined in accordance with the battery cooling fan operating level. Then, the controller 20 controls the operating voltage of the backseat temp door actuator 32 using the compensated operating target voltage value. In other words, the controller 20 controls the operating voltage of the backseat temp door actuator 32 to follow the compensated operating target voltage.

In an embodiment of the present disclosure, as for the operating voltage of the backseat temp door actuator, the second set voltage is set to the backseat temp door actuator operating voltage value for controlling the location of the backseat temp door to be the location that indicates the maximum cooling air amount (air amount passing through the evaporator). In other words, the second set voltage is set to a max cool voltage that means the voltage value corresponding to the maximum cooling air amount.

The max cool voltage is a controllable minimum value among the operating voltage values of the backseat temp door actuator 32. As the operating voltage value of the backseat temp door actuator 32 becomes closer to the max cool voltage, the cooling air path on the evaporator side is more opened and thus the amount of air that passes through the evaporator is more increased.

In other words, as the operating voltage of the backseat temp door and the target voltage become smaller, the location of the backseat temp door becomes closer to the max cool location where the amount of the air (cooling air amount) that passes through the evaporator becomes the greatest through maximum opening of the cooling air path on the evaporator side. Further, the downward control of the operating voltage of the backseat temp door actuator 32 means reduction of the operating target voltage value, as compared with that before the compensation, after the compensation through subtraction of the compensation value corresponding to the battery cooling fan operating level from the current operating target voltage. Accordingly, as the compensation value becomes larger and as the operating target voltage becomes lower, the amount of the cooling air that passes through the evaporator is increased.

In an embodiment of the present disclosure, as the operating level of the battery cooling fan becomes higher, a greater amount of the cooling wind may flow backward to the backseat. Thus, the controller 20 controls the location of the backseat temp door to be closer to the max cool location so that the more cooling air having passed through the evaporator can be supplied toward the backseat.

For this, on condition that the current operating voltage of the backseat temp door actuator 32 exceeds the second set voltage (e.g., 0.3V) corresponding to the max cool location, the downward compensation is performed so that the operating target voltage becomes lower as the battery cooling fan operating level becomes higher. In this case, the operating voltage of the backseat temp door actuator 32 is controlled to be closer to the second set voltage that is the operating voltage at the max cool location by making the compensation value larger as the battery cooling fan operating level becomes higher.

Referring to FIG. 3, it can be seen that the compensation value for the downward control of the backseat temp door actuator 32 is set to a larger value as the battery cooling fan operating level becomes higher. As described above, in an embodiment of the present disclosure, the compensation value for the downward control of the backseat temp door actuator 32 is preset to a value corresponding to the battery cooling fan operating level. The controller 20 determines the compensation value corresponding to the current battery cooling fan operating level using the set data as exemplified in FIG. 3.

Here, the set data is set using the data obtained through the prior research and evaluation and test processes and may be the map or table indicating the correlations between the battery cooling fan operating levels and the compensation values, or a diagram or a mathematical expression as shown in FIG. 3.

Referring to the set data of FIG. 3, in case of the sixth to eighth battery cooling fan operating levels, the compensation value is set to 1.0V. In a case that the battery cooling fan operating level is lower than the above levels, the compensation value is set to be proportionally reduced. For example, in a case of the third battery cooling fan operating level, the compensation value is set to 0.5V. In a case of the sixth to eighth levels, the compensation is performed with the value obtained by subtracting 1.0V from the current operating target voltage. In a case of the third level, the compensation is performed with the value obtained by subtracting 0.5V from the current operating target voltage, so that the operating voltage of the backseat temp door actuator 32 is downwardly controlled to the compensated operating target voltage value.

Next, if the air conditioning control for the battery cooling wind backseat backflow compensation starts, the controller 20 compares the current evaporator temperature detected by the evaporator temperature sensor 13 with a predetermined second set temperature (e.g., 2° C.) (S19). If the current evaporator temperature exceeds the second set temperature, the controller 20 performs the downward control by the battery cooling fan operating levels with respect to the evaporator temperature (S20). However, if the current evaporator temperature is equal to or lower than the second set temperature, the controller 20 does not perform the downward control with respect to the evaporator temperature.

The evaporator temperature control may be performed by adjusting an amount of refrigerant through the control of the operation of the air conditioner compressor 33. In other words, the controller 20 may control the current evaporator temperature to be the evaporator target temperature by controlling the operation of the air conditioner compressor 33. Here, the air conditioner compressor 33 may be an electric compressor 33 of which the driving can be controlled in accordance with a control signal of the controller 20 or may be a variable displacement compressor which can adjust the amount of refrigerant in accordance with the control signal of the controller 20.

In an ordinary air conditioning device, if the evaporator target temperature is determined in accordance with the air conditioning load, the controller 20 controls the operation of the compressor 33 so that the real-time evaporator temperature becomes the evaporator target temperature. In an embodiment of the present disclosure, the controller 20 compensates for the evaporator target temperature as large as the compensation value corresponding to the battery cooling fan operating level. Then, the controller 20 controls the operation of the compressor 33 based on the compensated evaporator target temperature. In this case, the controller 20 may control the operation of the compressor 33 so that the real-time evaporator temperature detected by the evaporator temperature sensor 13 follows the compensated evaporator target temperature.

In an embodiment of the present disclosure, the downward control by the battery cooling fan operating levels for the evaporator temperature is the control to reduce the evaporator target temperature as large as the compensation value being determined in accordance with the battery cooling fan operating level. In this case, the compensation value becomes a temperature value. Further, as the battery cooling fan operating level becomes higher, the compensation value that is the temperature value is set to a larger value.

The second set temperature may be set to the minimum evaporator temperature, and for example, may be set to 2° C. In an embodiment of the present disclosure, as the battery cooling fan operating level becomes higher, more cooling wind may flow backward to the backseat. In this case, the temperature of the cooling air having passed through the evaporator and the air for the air conditioning are adjusted to be lower by controlling the evaporator temperature to be lower.

For this, as the battery cooling fan operating level becomes higher, the evaporator target temperature is determined to be closer to the second set temperature that is the minimum evaporator temperature in case that the current evaporator temperature exceeds the second set temperature that is the minimum evaporator temperature. As the battery cooling fan operating level becomes higher, the compensation value becomes larger and the evaporator temperature is controlled to be closer to the second set temperature that is the minimum evaporator temperature.

Referring to FIG. 3, it can be seen that the temperature compensation value for the downward control of the evaporator temperature is set to a larger value as the battery cooling fan operating level becomes higher. As described above, in an embodiment of the present disclosure, the compensation value for the downward control of the evaporator temperature is preset to a value corresponding to the battery cooling fan operating level. The controller 20 determines the compensation value corresponding to the current battery cooling fan operating level using the set data as exemplified in FIG. 3.

Here, the set data is set using the data obtained through the prior research and evaluation and test processes and may be the map or table indicating the correlations between the battery cooling fan operating levels and the compensation values, or may be a diagram or a mathematical expression as shown in FIG. 3.

As exemplified in FIG. 3, the compensation value for the downward control of the evaporator temperature may be set through differentiation to the value corresponding to the battery cooling fan operating level. As the battery cooling fan operating level differs, the compensation value may be set to a different temperature value at least a partial operating level.

As described above, in the present disclosure, if the determined entry condition is satisfied from the state information collected from the vehicle, the air conditioning control for the battery cooling wind backseat backflow compensation is performed. Also, the upward control or the downward control by the battery cooling fan operating levels for the air conditioning device components predetermined in the air conditioning control process for the battery cooling wind backseat backflow compensation is performed.

Finally, according to the present disclosure, in case that the battery cooling and the vehicle interior cooling are simultaneously performed in the vehicle, such as hybrid electric vehicle (HEV) or plug-in HEV (PHEV), in which 3-zone control is possible, the upward control or the downward control by the battery cooling fan operating level for the above-described air conditioning components is performed. Thus, the conventional problem in that the battery cooling wind flows backward to the backseat and the backseat keeps getting hot can be solved and the comfort of the backseat can be maintained.

According to the present disclosure, it becomes possible to solve the problem of the backseat temperature increase through the air conditioning control logic in association with the automatic air conditioning control without the necessity of changing the backseat control to the 4-zone control and without the separate hardware addition, manufacturing cost increase, and weight increase.

Although embodiments of the present disclosure have been described in detail, the scope of the present disclosure is not limited thereto. Various modifications and improvements by those having ordinary skill in the art using the basic concept of the present disclosure being defined in the appended claims are also included in the scope of the present disclosure.

What is claimed is:

1. A method for controlling air conditioning of a vehicle, the method comprising:
   determining, by a controller, whether an air conditioning control entry condition for battery cooling wind backseat backflow compensation is satisfied from environment information collected from the vehicle;
   starting, by the controller, air conditioning control for the battery cooling wind backseat backflow compensation in response to determining that the entry condition is satisfied;
   determining, by the controller, a compensation value corresponding to a current operating level of a battery cooling fan when the air conditioning control for the battery cooling wind backseat backflow compensation is started;
   compensating, by the controller, for a current control variable value of an air conditioning device component using the determined compensation value; and
   performing, by the controller, an air conditioning operation for compensation in accordance with a backflow of a battery cooling wind having cooled a battery toward a vehicle backseat by controlling a state of the air conditioning device component in accordance with the compensated control variable value.

2. The method of claim 1, wherein the environment information comprises one or two of an ambient temperature detected by an ambient temperature sensor or a solar insolation amount detected by an insolation sensor.

3. The method of claim 2, wherein the air conditioning control entry condition for the battery cooling wind backseat backflow compensation comprises at least one of a condition on which the ambient temperature detected by the ambient temperature sensor is higher than a first predetermined set temperature or a condition on which the solar insolation amount detected by the insolation sensor is larger than a predetermined set value.

4. The method of claim 1, wherein, in starting the air conditioning control for the battery cooling wind backseat backflow compensation, the controller is configured to start the air conditioning control for the battery cooling wind backseat backflow compensation in a state where it is determined that the entry condition is satisfied, air conditioner-on and automatic air conditioning control are currently selected, and the battery cooling fan is in operation.

5. The method of claim 1, wherein, in compensating for the current control variable value of the air conditioning device component, the controller is configured to determine whether a compensation condition determined based on the current operating state information of the air conditioning device component is satisfied, and configured to compensate for the current control variable value of the corresponding air conditioning device component only in case that the compensation condition is satisfied.

6. The method of claim 5, wherein the air conditioning device component comprises an air conditioning blower, a backseat temp door actuator, and an evaporator.

7. The method of claim 6, wherein the operating state information of the air conditioning device component comprises an operating voltage of the air conditioning blower, an operating voltage of the backseat temp door actuator, and a temperature of the evaporator.

8. The method of claim 7, wherein the compensation condition comprises:
   a condition on which a current operating voltage of the air conditioning blower is lower than a first predetermined set voltage;
   a condition on which a current operating voltage of the backseat temp door actuator exceeds a second predetermined set voltage; and
   a condition on which a current evaporator temperature detected by the evaporator temperature sensor exceeds a second predetermined set temperature.

9. The method of claim 6, wherein, in compensating for the current control variable value of the air conditioning device component, the current control variable value comprises an operating target voltage of the air conditioning blower, and
in performing the air conditioning operation for the compensation, the controller is configured to increase a rotation speed of the air conditioning blower by increasing the operating target voltage of the air conditioning blower by as much as the compensation value corresponding to the operating level of the battery cooling fan.

10. The method of claim 9, wherein, in determining the compensation value, the higher the operating level of the battery cooling fan becomes, the larger the compensation value is determined for compensating for the operating target voltage of the air conditioning blower, and wherein the rotation speed of the air conditioning blower is further increased by increasing the compensation value for compensating for the operating target voltage of the air conditioning blower.

11. The method of claim 6, wherein, in compensating for the current control variable value of the air conditioning device component, the current control variable value comprises an operating target voltage of the backseat temp door actuator, and
in performing the air conditioning operation for the compensation, the controller is configured to increase an amount of cooling air that passes through the evaporator by means of a backseat temp door by reducing the operating target voltage of the backseat temp door actuator by as much as the compensation value corresponding to the operating level of the battery cooling fan.

12. The method of claim 11, wherein, in determining the compensation value, the higher the operating level of the battery cooling fan becomes, the larger the compensation value is determined for compensating for the operating target voltage of the backseat temp door actuator, and wherein the amount of cooling air that passes through the evaporator is further increased by the compensation value for compensating for the operating target voltage of the backseat temp door actuator.

13. The method of claim 6, wherein, in compensating for the current control variable value of the air conditioning device component, the current control variable value comprises an evaporator target temperature, and
in performing the air conditioning operation for the compensation, the controller is configured to lower a temperature of a cooling air that passes through the evaporator by lowering the evaporator target temperature by as much as the compensation value corresponding to the operating level of the battery cooling fan.

14. The method of claim 13, wherein, in determining the compensation value, the higher the operating level of the battery cooling fan becomes, the larger the compensation value is determined for compensating for the evaporator target temperature, and wherein the temperature of the cooling air that passes through the evaporator is further lowered by increasing the compensation value for compensating for the evaporator target temperature.

15. The method of claim 14, wherein the controller is configured to control an operation of a compressor so that a current evaporator temperature detected by an evaporator temperature sensor follows the evaporator target temperature compensated for by the compensation value.

* * * * *